UNITED STATES PATENT OFFICE.

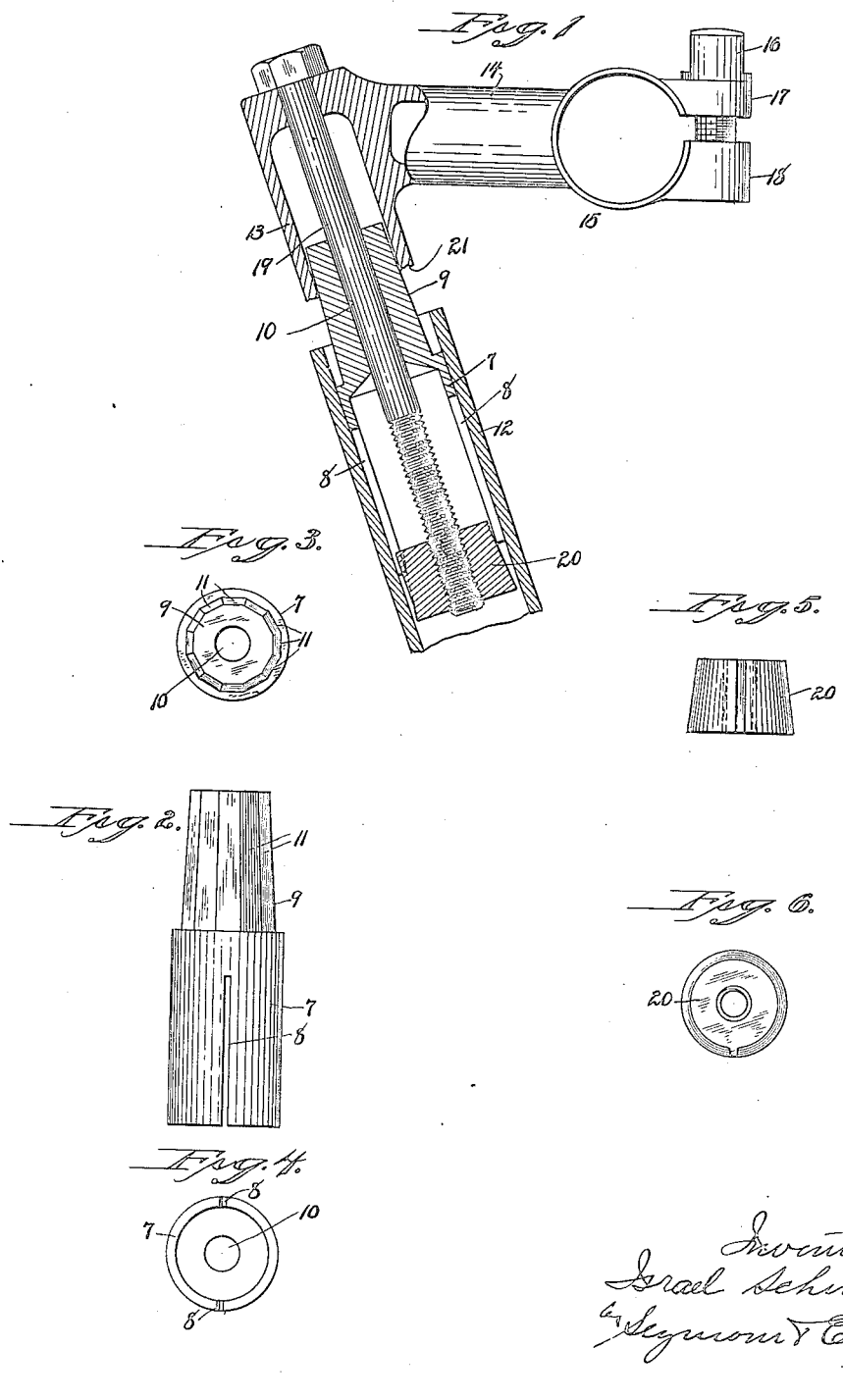

ISRAEL SCHWARTZ, OF DANBURY, CONNECTICUT.

HANDLE-BAR-POST-REPAIR PART FOR BICYCLES.

1,379,784.　　　　Specification of Letters Patent.　　Patented May 31, 1921.

Application filed November 29, 1920. Serial No. 427,060.

*To all whom it may concern:*

Be it known that I, ISRAEL SCHWARTZ, a citizen of the United States, residing at Danbury, in the county of Fairfield and State of Connecticut, have invented a new and useful Improvement in Handle-Bar-Post-Repair Parts for Bicycles; and I do hereby declare the following, when taken in connection with the accompanying drawings and the characters of reference marked thereon, to be a full, clear, and exact description of the same, and which said drawings constitute part of this application, and represent, in—

Figure 1, a view partly in vertical section and partly in side elevation showing my improved handle-bar post repair-part as in use.

Fig. 2, a detached view in side elevation of the repair-part.

Fig. 3, a plan view thereof.

Fig. 4, a reverse plan view thereof.

Fig. 5, a detached view of the expansion-nut.

Fig. 6, a plan view thereof.

My invention relates to an improved handle-bar post repair-part for bicycles, the object being to provide simple, inexpensive means for repairing the handle-bar posts of bicycles when they break, which is a matter of frequent occurrence. With these ends in view, my invention consists in a handle-bar post repair-part having certain details of construction as will be hereinafter described and pointed out in the claims.

In carrying out my invention as herein shown, my improved one-piece repair part consists of a short tubular portion 7 formed with a central longitudinal slot 8 entering its open lower end, and provided at its closed upper end with an integral tapering tenon 9, traversed by a concentric bolt-hole 10 and shown as having facets 11 to prevent its rotation in use, though this is not a necessary feature. The external diameter of the tubular portion 7 is such as to permit it to be introduced into the upper end of the steering-fork tube 12 of a standard bicycle while the diameter of the tenon 9 is such as to adapt it to be crowded into the tubular handle-bar post 13 which is made integral with a hollow reach 14 formed at its rear end with a transverse sleeve 15 receiving the handle-bar (not shown) which is secured in place by a clamping-screw 16 passing through lugs 17 and 18. With my improved repair-part I employ the usual long clamping bolt 19 and tapered expansion-nut 20.

Supposing the tubular handle-bar post breaks off as at 21, its slotted lower end is removed from the steering-fork tube 12 and discarded and replaced by one of my improved repair parts, into the split lower end of which the expansion-nut is crowded after which the said end is introduced into the steering-fork tube. The broken end of the handle-bar post is now crowded down over the tenon of the repair-part and the screw-bolt passed downward through the post and tenon and into the nut. The bolt is then turned to cause the nut to spread the tubular portion 7 of the repair part and also to crowd the tenon 9 of the repair part into the broken handle-bar post, as clearly shown in Fig. 1. By means of my handle-bar post repair-part, I am enabled at slight cost and a minimum of inconvenience to repair the damage to a bicycle resulting from the breakage of its handle-bar post.

I claim:

1. A handle-bar post repair-part for bicycles, the said part having a tubular lower portion formed with a longitudinal slot entering its open lower end and formed at its upper end with an integral tapering tenon traversed by a concentric bolt hole, the tubular portion of the part being adapted to be introduced into the steering-fork tube of a bicycle and the tenon of the part being adapted in size to be crowded into the broken end of a tubular handle-bar post.

2. The combination with the handle-bar post and steering-fork tube of a bicycle, of a repair-part adapted at its lower end to be entered into the tube and provided at its upper end with a tenon adapting it to be entered into the post, an expansion-nut adapted to be entered into the lower end of the said part, and a screw bolt passing through the said post and the tenon of the repair part and entering the said expansion-nut which it operates to bind the repair-part and the fork together and to draw the tenon of the part and the post firmly together.

In testimony whereof, I have signed this specification in the presence of two subscribing witnesses.

ISRAEL SCHWARTZ.

Witnesses:
　D. T. CORBETT,
　L. K. TAYLOR.